(12) United States Patent
Kessler et al.

(10) Patent No.: US 7,177,031 B2
(45) Date of Patent: Feb. 13, 2007

(54) GRATING ARRAY SYSTEMS HAVING A PLURALITY OF GRATINGS OPERATIVE IN A COHERENTLY ADDITIVE MODE AND METHODS FOR MAKING SUCH GRATING ARRAY SYSTEMS

(75) Inventors: Terrance J. Kessler, Mendon, NY (US); Joachim Bunkenburg, Victor, NY (US); Hu Huang, Pittsford, NY (US)

(73) Assignee: University of Rochester, Rochester, NY (US)

( * ) Notice: Subject to any disclaimer, the term of this patent is extended or adjusted under 35 U.S.C. 154(b) by 187 days.

(21) Appl. No.: 10/836,763

(22) Filed: Apr. 30, 2004

(65) Prior Publication Data

US 2004/0227956 A1 Nov. 18, 2004

Related U.S. Application Data

(60) Provisional application No. 60/469,739, filed on May 12, 2003.

(51) Int. Cl.
*G01B 9/02* (2006.01)
(52) U.S. Cl. ...................... 356/521; 356/508
(58) Field of Classification Search ........ 356/508–511, 356/521, 622, 139.04, 139.07, 139.1, 399–401, 356/614–616; 250/559.37
See application file for complete search history.

(56) References Cited

OTHER PUBLICATIONS

Trentelman, M. et al., Finite size compression gratings in a large aperture chirped pulse amplification laser system, Applied Optics, vol. 36, No. 33, pp. 8567-8573, (1997).
Zhang, T. et al., An array-grating compressor for high-power chirped-pulse amplification lasers, Optics Communications, vol. 145, pp. 367-376, (1998).

*Primary Examiner*—Gregory J. Toatley, Jr.
*Assistant Examiner*—Marissa J. Detschel
(74) *Attorney, Agent, or Firm*—Kenneth J. Lukacher; Martin Lukacher (57) ABSTRACT

A plurality of gratings (G1, G2) are arranged together with a wavefront sensor, actuators, and feedback system to align the gratings in such a manner, that they operate like a single, large, monolithic grating. Sub-wavelength-scale movements in the mechanical mounting, due to environmental influences, are monitored by an interferometer (28), and compensated by precision actuators (16, 18, 20) that maintain the coherently additive mode. The actuators define the grating plane, and are positioned in response to the wavefronts from the gratings and a reference flat, thus producing the interferogram that contains the alignment information. Movement of the actuators is also in response to a diffraction-limited spot on the CCD (36) to which light diffracted from the gratings is focused. The actuator geometry is implemented to take advantage of the compensating nature of the degrees of freedom between gratings, reducing the number of necessary control variables.

8 Claims, 7 Drawing Sheets

Interferometer yields tip, tilt, rotation, lateral shift & piston information

1) $OPD_L = -OPD_P$    where $OPD_L = \Delta x(\lambda/d)$ ;    $OPD_P = 2(\Delta z)\cos\theta_r$ $\Delta x = LS - Md$    $\Delta z = P - N\lambda$

*Lateral shift and piston perfectly compensate*

2) (Rotation angle $\Delta\theta_R$) = (−) (Tip angle $\Delta\theta_y$) * ctg (Incidence angle $\theta_i$)

*Grating rotation and grating tip perfectly compensate*

3) (Tilt angle $\Delta\theta_x$) = 0

*Tilt angle between the gratings is adjusted to zero*

Fig.4a
Fragmentary Elevational View of Gratings

GRATING ARRAY SYSTEMS HAVING A PLURALITY OF GRATINGS OPERATIVE IN A COHERENTLY ADDITIVE MODE AND METHODS FOR MAKING SUCH GRATING ARRAY SYSTEMS

Priority is claimed to U.S. Provisional Application No. 60/469,739, filed May 12, 2003, which is herein incorporated by reference.

The United States Government has rights in this invention under an Agreement DE-FC03-92SF19460 between the U.S. Department of Energy and The University of Rochester.

The present invention relates to grating array systems, which are made up of a plurality of individual gratings, and methods of making such systems so as to present an aperture for incident light to be diffracted by the gratings which is the same as a single monolithic grating having the same aperture, and which allows the energy from each grating in the array to add coherently to the energy from adjacent gratings in the array, the gratings in the array thereby being operative in a coherently additive mode.

Many grating applications such as high-powered chirp-pulse laser amplifiers require large, for example meter sized, gratings to achieve desired energy levels while limiting fluences to below damaged threshold of the grating surfaces. The cost of grating systems militates against the use of large gratings, and makes a system having a plurality of gratings arranged as tiles to provide a grating array, a desirable, cost effective approach.

It is self-evident that tiled gratings act as a larger grating. However, merely arranging the gratings as tiles does not provide a system, which acts like a single monolithic grating in a coherently additive mode where the light diffracted from each grating is in phase, much like coherent light from a laser. The problem arises because the individual grating tiles have many degrees of freedom including lateral motion, tip, tilt and rotation in the plane of the grating along the direction of the grooves. Moreover, the motions in each degree of freedom are interactive. Accordingly, the problem of providing grating arrays of tiled gratings operative in coherently additive mode is not readily amenable of solution. A practical mechanism for providing coherently additive grating in an array which corrects for relative displacement and rotation errors is not disclosed or apparent merely from showings of tiled gratings. For example in an article by Zhang, Yonemura and Kato, in Optics Communications 145 (1998) 367–376, entitled "An Array Grating Compressor For High-Powered Chirp-Pulsed Amplification Lasers, recognition of the need for such a practical mechanism leads to the statement in the last sentence of the article "The fabrication of the array grating would be difficult because of the alignment errors, and a new fabricating technique would be required". No such technique is disclosed in this article.

The present invention provides a grating array system having a plurality of gratings which are operative in a coherently additive mode by controlling piston shift (the relative movement of one grating with respect to the other in a direction perpendicular to the plane of the grating) wherein the effective lateral shift L and the effective piston shift P satisfy the following equations (1) $OPD_L = -OPD_P$, where $\Delta x = L - Md$, $OPD_L = \Delta x(\lambda/d)$; $\Delta z = P - N\lambda$, and $OPD_P = 2(\Delta z)\cos\theta_i$, wherein L is the lateral shift between gratings (also called LS herein), M is an integer, x is movement in the lateral direction, d is the grating pitch, $\lambda$ is the wavelength of light, which is the average wavelength for polychromatic light, OPD is the optical path difference, P is the piston shift, N is any integer, z is the movement in the piston shift direction (perpendicular to the plane of the gratings, and $\theta_r$ is the rotation of one grating with respect to each other about a line perpendicular to the grating plane; (2) Rotation angle, $\Delta\theta_r =$ (−) Tip angle $\Delta\theta y$*ctg incidence angle, $\theta_i$; and (3) Tip angle, $\Delta\theta x = 0$. In all the equations $\Delta$ is the change in x, y, z, $\theta x$, $\theta_r$, and $\Delta\theta y$, as the case may be.

The piston shifts may be obtained by three actuators along opposite sides and along an end of the grating which is to be adjusted. These actuators have a surface which define the plane of the grating. By adjusting the piston shift in response to an interferogram of the diffracted light from the gratings and reference illumination, and from a diffraction limited spot to which the diffracted light from the gratings is focused in the far field, the conditions for operation in the coherently additive mode is obtained. The actuators are adjusted until the interferogram shows that the diffracted light from both gratings is in phase and the spot is a single peak diffraction limited spot.

Accordingly, it is a feature of the present invention to provide improved grating array systems for the control of the spatial and temporal characteristics of light diffracted from the gratings of the array.

It is a further feature of the invention to provide an improved grating array system, and method of making same, wherein the gratings are operative in coherently additive mode.

It is still a further feature of the invention to provide a grating array system, operative in a coherently additive mode, which is capable of handling higher energy and power levels (fluences) than currently available single or monolithic gratings.

It is a still further feature of the present invention to provide a grating array system which enables, in the event of laser damage to one of the grating tiles, the replacement of that tile without replacing the entire grating.

The foregoing advantages and features and objects of the invention will become more apparent from a reading of the following description in connection with the accompanying drawings wherein.

Figure 1:
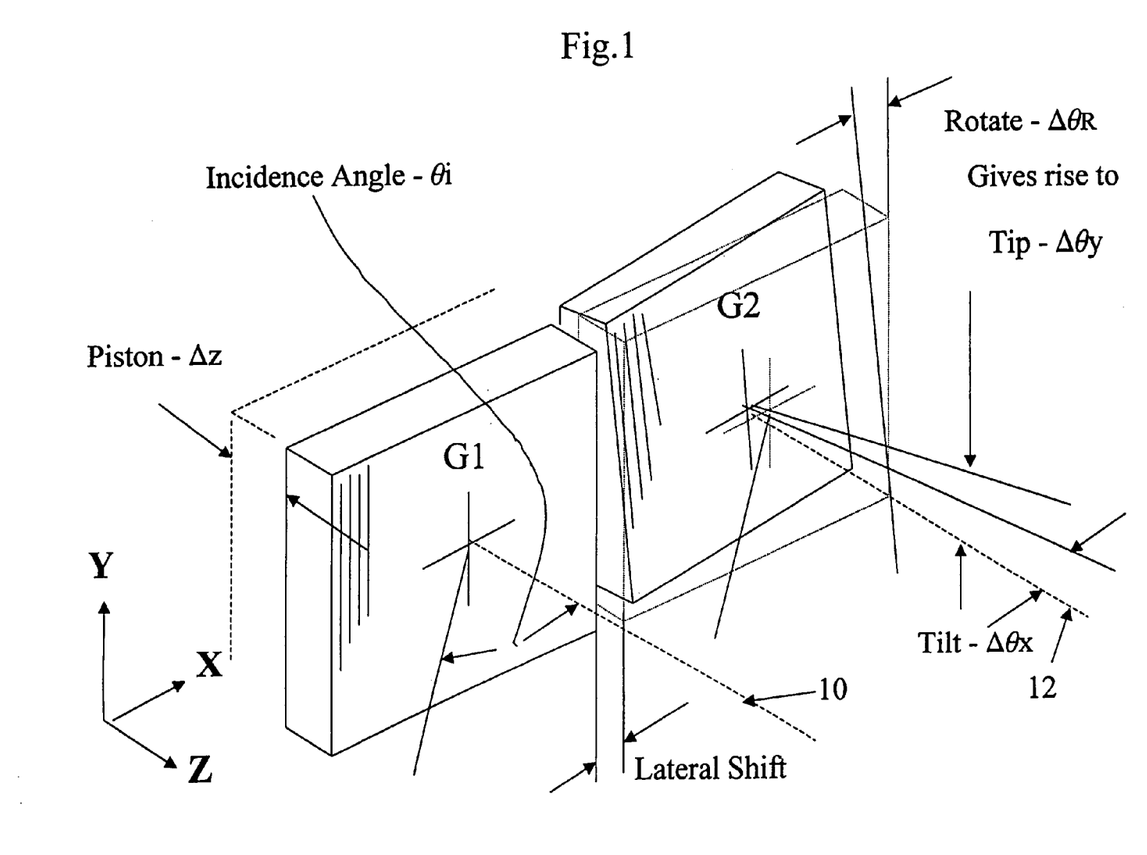
FIG. 1 is a perspective view showing two gratings G1 and G2 of a grating array showing the coordinate systems, definitions of degrees of freedom (displacements, rotation, and the tip and tilt angles) which are used in other figures and the description herein.

Referring more particularly to the drawings, in FIG. 1 there are shown the five degrees of freedom of a pair of gratings which must be accommodated in order to align the grating. Specifically these degrees of freedom are angular displacements and linear displacements. The angular displacements are defined as the tip which is an angular displacement in the y direction which imposes an angle $\Delta\theta y$. The tilt is an angular displacement in the x direction, $\Delta\theta x$. There is an angular displacement or rotation about, shown by the dash lines 10 and 12, through the center of the gratings and perpendicular to the grating planes. The piston is the movement of the gratings linearly in the Z direction. This movement is indicated as piston-$\Delta z$. Alignment must consider all of these degrees of freedom shown in FIG. 1. It will become more apparent from the following description and also from FIG. 3A that three actuators operating in the piston direction, two along opposite sides and one along an edge of one of the gratings can accommodate all of the degrees of freedom and provide a grating array which is operative in the additive coherent mode.

As the description proceeds, it will also become apparent how the herein described system aligns the gratings for operation in the additive coherent mode. The principal parts of the system are:

1. An assembly of the gratings G1 and G2 on active actuators 16, 18, and 20 which are operative to reduce the from five to three the degrees of freedom of movement of the gratings G1 with respect to G2. These are piston movement of the actuators 16, 18, and 20. The degrees of freedom are tip, tilt, rotation, lateral-shift and piston motion between the gratings.

2. An interferometric sensor 28 (FIG. 5) that yields information on the effect of interacting errors in the five degrees of freedom, from an interferogram formed in an interferometric cavity of the sensor 28, while the gratings are being aligned by the actuators for coherent mode operation (the coherence of the waves diffracted from the sensor being illustrated in FIG. 2). The main beams may be incident on the gratings and diffracted for use in a system incorporating gratings, such as a compressed pulse laser amplifier, while the alignment is maintained by the sensor 28 and a diffraction limited spot sensor 36, also shown in FIG. 5.

3. A sensor 36 (FIG. 5) which responds to a diffraction limited spot representing the phase relationship of the gratings and indicating that they are set for operations in the additive coherent mode.

Figure 5:
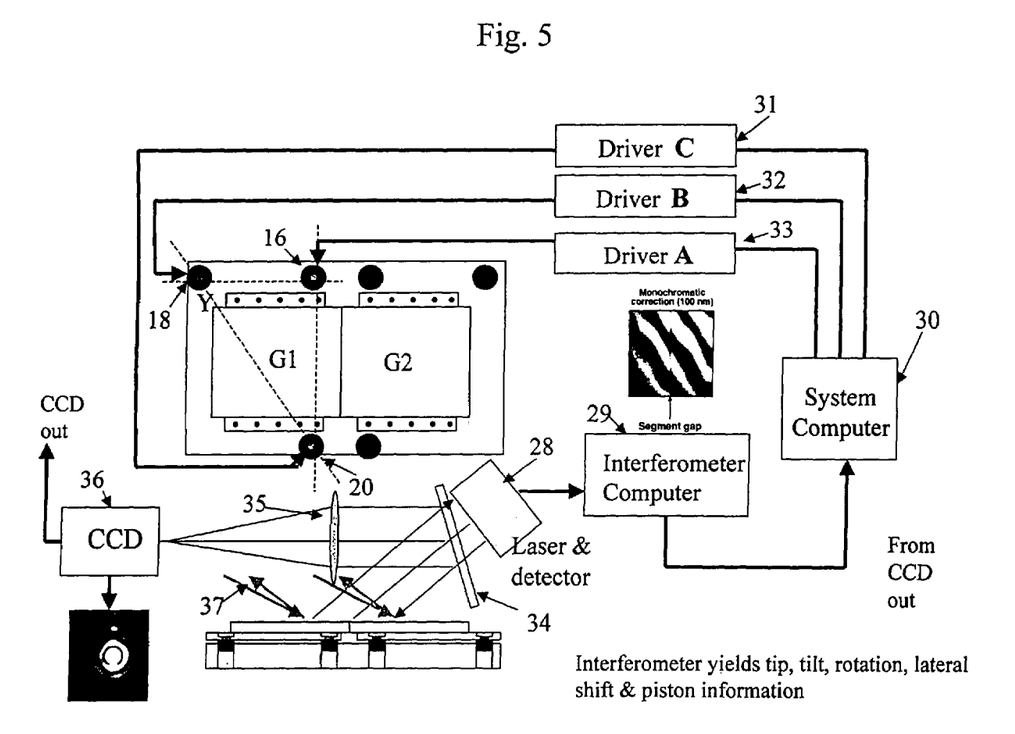
FIG. 5 is a schematic diagram illustrating the system including the gratings which motivates gratings by piston shifting and thereby effectively tipping and tilting them so as to provide coherent additive operation.

4. Alternatively, the system may use a set of capacitive sensors (FIG. 6) which, when used individually and in pairs provides the same information as the interferometric wave form sensor 28 (FIG. 5).

The apparatus and method of accommodating the five degrees freedom with only three actuators 16, 18, and 20 is an important feature of the invention enabling the alignment of the gratings for operation in the additive coherent mode. Table 1 shows the 5 degrees of freedom and their effect on the optical path difference (OPD) which when set to zero by the actuators compensates for errors in each of the 5 degrees of freedom. The table shows that the adjustment provided by only three actuators which control the piston displacement (P) the vertical tip (TV) and the horizontal tilt (TH) compensates or adjusts the gratings for coherent operation. Table 1 also shows the interaction between the degrees of freedom. Although the adjustments are highly interactive, the system accommodates such interactivity and aligns the gratings for operation in the additive coherent mode.

More particularly, as shown in FIG. 1, Tip, Tilt, and Rotation in the plane of the grating. If there are two, or more gratings, two more degrees of freedom have to be considered. These are piston and lateral shift between the gratings. All five degrees of freedom for two gratings, G1 and G2, are defined with respect to the two grating normals, 10 and 12, in FIG. 1. For the purpose of illustration, one grating can be considered stationary, and all variables are assigned to the other grating. They are: Tip—$\Delta\theta y$; Tilt—$\Delta\theta x$; Lateral Shift—$\Delta x$; Piston—$\Delta z$; Rotation—$\Delta\theta_R$. Also shown is the incidence angle $\theta i$ of the incoming beam which is diffracted by the array system of G1 and G2.

Figure 2:
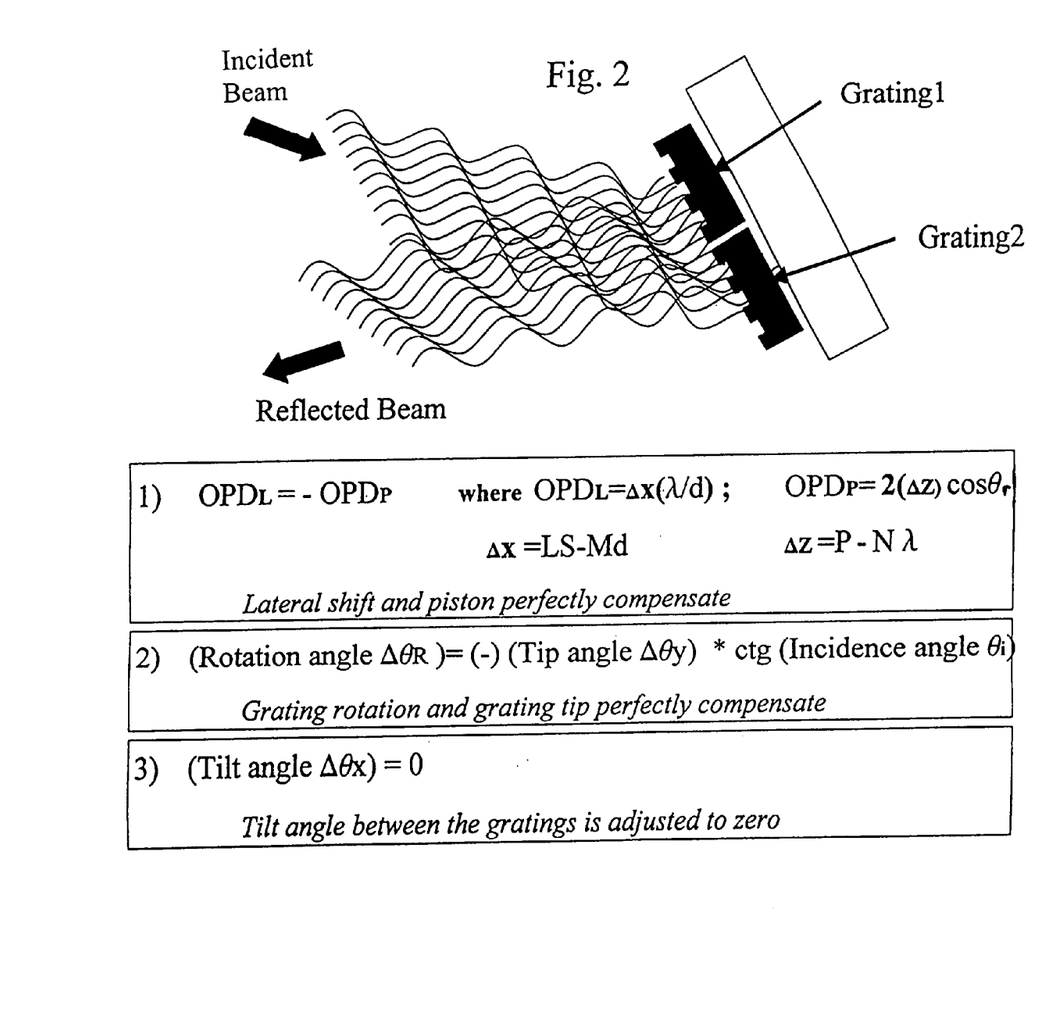
FIG. 2 is a schematic diagram illustrating the conditions for coherent addition from the gratings and specifying the locations angularly and lineally of the gratings to provide operation thereof in the coherent additive mode, so that the light diffracted by the gratings is coherent.

Consider a collimated beam incident upon pair of gratings G1 and G2. There is optical compensation between a change in the lateral shift, $\Delta x$, and a change in the piston, $\Delta z$. Also, a change in the grating rotation, $\Delta\theta$, can be compensated for by a change in the vertical tip, $\Delta\theta y$. The exact mathematical conditions for additive coherent operation are shown, the equations forming part of FIG. 2. Also shown in FIG. 2 is the tilt angle, $\Delta\theta x$, between the gratings needing to be zero for coherent addition.

The compensating nature of these terms, as explained above, leads to a reduction in the degrees of freedom that need to be controlled. The parameters adjusted to achieve coherent addition are piston, $\Delta z$; vertical tip, $\Gamma\theta y$; and horizontal tilt, $\Delta\theta x$. Table I summarizes the compensations and the active adjustments. All these adjustments are accomplished with the actuators 16, 18 and 20 which only move in a vertical (up/down) direction.

TABLE I

Adjustment Matrix

| Degree Of Freedom | Physical Parameter | Equivalency In Optical Path Difference (OPD) | Provided Adjustment |
|---|---|---|---|
| Piston (P) | $\Delta z$ | $\Delta z$ compensates $\Delta x$ | Yes |
| Lateral Shift (LS) | $\Delta x$ | $\Delta x$ compensates $\Delta z$ | No |
| Tip Vertical (TV) | $\Delta\theta y$ | $\Delta\theta y$ compensates $\Delta\theta_R$ | Yes |
| Tilt Horizontal (TH) | $\Delta\theta x$ | | Yes |
| Grating Rotation (R) | $\Delta\theta_R$ | $\Delta\theta_R$ compensates $\Delta\theta y$ | No |

Table I shows the interaction between degrees of freedom at an angle of incidence near the Littrow position, and the parameters that are adjusted to achieve coherent addition.

Figures 3A, 3B:
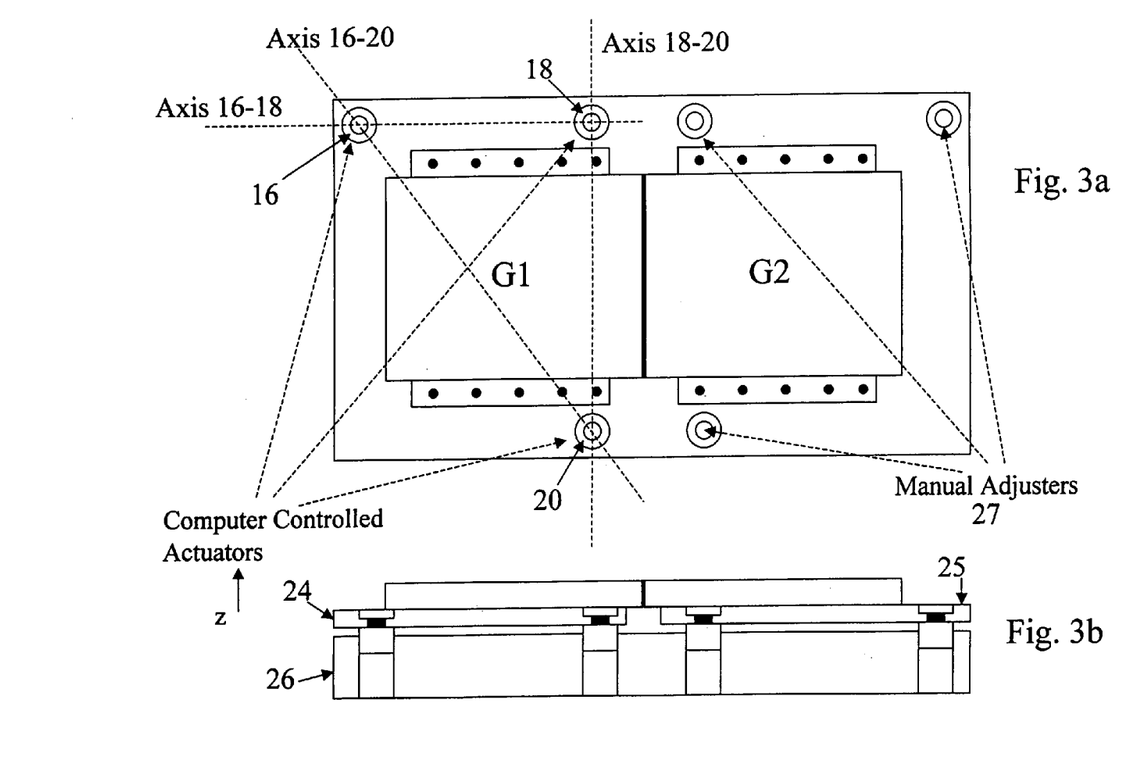
FIGS. 3A and 3B are, respectively, plan and elevational views of an exemplary array of two gratings G1 and G2 and the mechanism for supporting and motivating the gratings so that they can be operative in the coherent additive mode.

FIG. 3A and FIG. 3B are the frontal- and side views of our mounted gratings G1 and G2 on their respective support plates, 24 and 25. Both are mounted to a common base, 26. Grating G1 is mounted to the baseplate via precision adjustment screws containing piezo-electric actuators (PZ), 16, 18, and 20, providing active, sub-micron positioning. Grating G2 is mounted to the baseplate via adjusters 27 which may be precision adjustment screws. These are used in the initial alignment discussed below. PZ 16 and 18 define an Axis (16–18), PZ 16 and 20 define an Axis (16–20); and PZ 18 and 20 define an Axis (18–20).

Figure 4A:
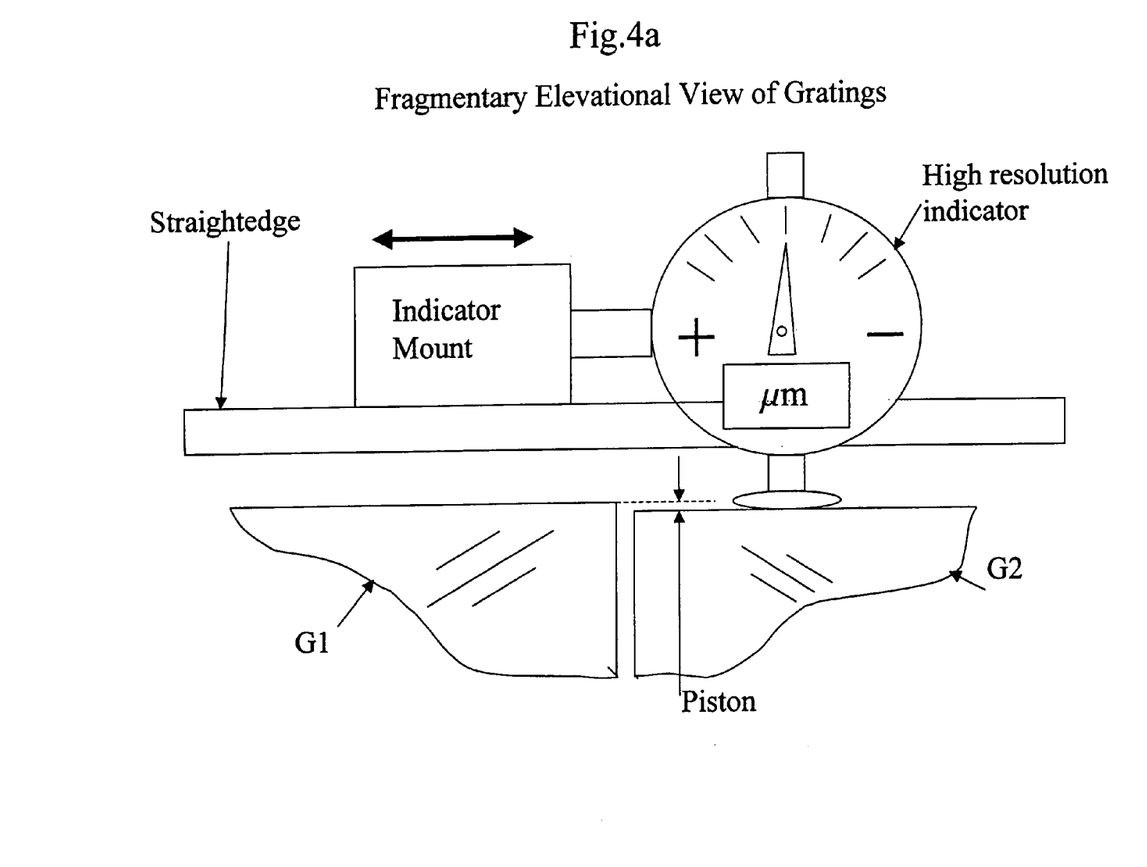
FIG. 4A is a fragmentary elevational view showing the use of a height gage to initially adjust the gratings to verify the piston displacement (the location of the planes of the gratings in the array) relative to each other.

It is desirable to initially set the grating within the range where the actuators are effective to provide corrections for additive coherent operations. To this end, the gratings are mounted, on their support-plates to mechanical tolerances. A coordinate measuring machine, or suitable indicators on a surface plate may aid in aligning the grating edges, and the grating-planes to within a few micrometers, as shown in FIG. 4A. The presently preferred method to check and set the piston between the gratings is shown in FIG. 4A. A straight-edge is placed parallel to the gratings. With the aid of a high-resolution indicator, touching the edge of the gratings, and sliding along the straight-edge, the piston, or vertical step, between the grating surfaces is indicated. The piston can be adjusted by equal motion in all three of the grating adjusters 27 (FIG. 3B). Typically, the residual piston between the gratings is set to within ±3 µm. This technique provides the initial adjustment.

Figure 4B:
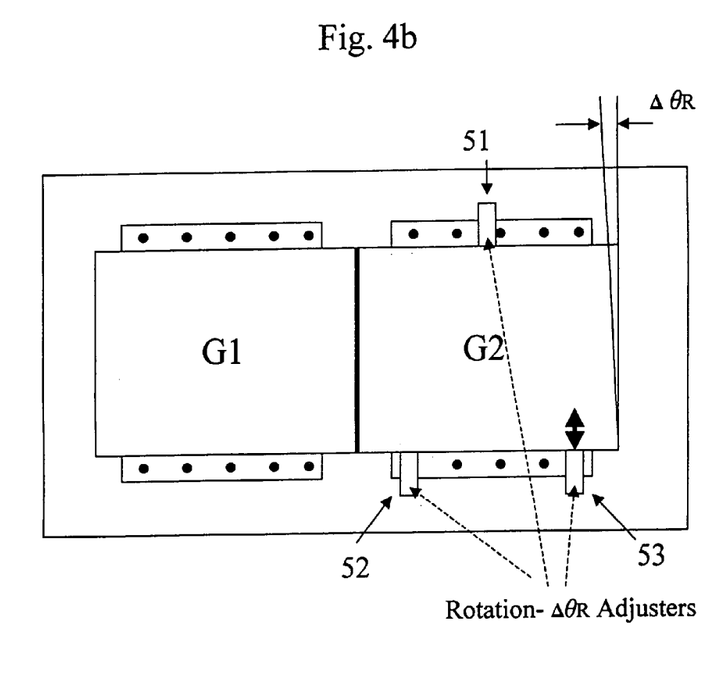
FIG. 4B is a view like FIG. 3A and shows use of rotation adjusters to initially set the rotation of the gratings.

Another initial adjustment may also check and adjust, if necessary, the rotation between the gratings. See FIG. 4B. Three manually positional adjusters 27, such as precision, micrometer type screws 51, 52 and 53 adjacent opposite edges of grating G2 are used. Also, the gratings G1 and G2 are placed in an interferometer cavity as a reflecting surfaces. The interferometer may be of the conventional Fizeau or Tyman Green type, which produces visually observable fringes. The entire assembly including G1 and G2 is set up in the interferometer normal to the beam, at an incidence angle of zero, on an optical table. The gratings are manually set using the actuators 16, 18 and 20 and the adjusters 27 individually to be parallel to the transmission flat of the interferometer to within a few tilt fringes. The fringes should have the same sign and magnitude. This establishes the parallelism between the gratings. Then the entire assembly is rotated on the optical table to the Littrow position. A change in the vertical component, $\Delta\theta y$, of the fringe pattern between the gratings is an indicator of the grating grooves (rotation) not being parallel to each other. Adjusters 51, 52 and 53, FIG. 4B, are used to match the fringe pattern between the gratings. Typically, the rotation is set to be within $\lambda/4$. For some applications, it may be desirable to operate the grating off the Littrow position.

FIG. 5 shows an operational diagram for operating the array to achieve coherent addition of tiled gratings. An interferometer 28 sends its laser beam to the gratings at an incidence angle, in the vicinity of the Littrow angle. The optical detectors in the interferometer computer 29 enable reading of the fringes, thereby measuring the piston, $\Delta z$, Tip—$\Delta\theta y$ and Tilt—$\Delta\theta x$, the interferometer computer drives the systems computer 30. Algorithms (programs for translating fringes into outputs representing grating orientation) which are available may be used in the computers 29 and 30. The systems computer 30 provides signals to the piezo actuators via drives 31, 32, and 33, so that the piezo actuators 16, 18 and 20 move into the opposite direction of the measured error value; thus bringing the gratings into alignment to achieve additive coherent operation. For example, an adjustment to actuator 18 effects a tilt about axis (16–20). An adjustment to actuator 16 effects a tilt about axis (18–20), and so on. Piston adjustment is described in the previous paragraph.

In addition, a beam splitter 34 takes a portion of the interferometer beam and directs it through a lens, 35, onto a CCD camera 36. At the camera 36, a far field, diffraction limited focal spot containing information from both gratings is presented. The spot is a measure of the coherent addition. The CCD sends a signal representing the shape of the spot to the system's computer which computes the Strehl Ratio, and provides a status of the functioning of the grating array system. The Strehl Ratio may be defined as the ratio of the light intensity at the peak of the diffraction pattern of an aberrated image, to that of the peak of an aberration free image. In the desired case, the focal spot is a diffraction limited spot with a Strehl Ratio of 1. For a half-wave misalignment in piston between the gratings, for example, the Strehl Ratio drops to 0.5.

Also depicted in FIG. 5, there is another laser beam 37 at the conjugate angle of the gratings. This beam represents the high-power beam which may undergo chirped pulse amplification using the grating array. Since the two laser beams are at conjugate angles, they do not interfere with one another.

Figure 6:
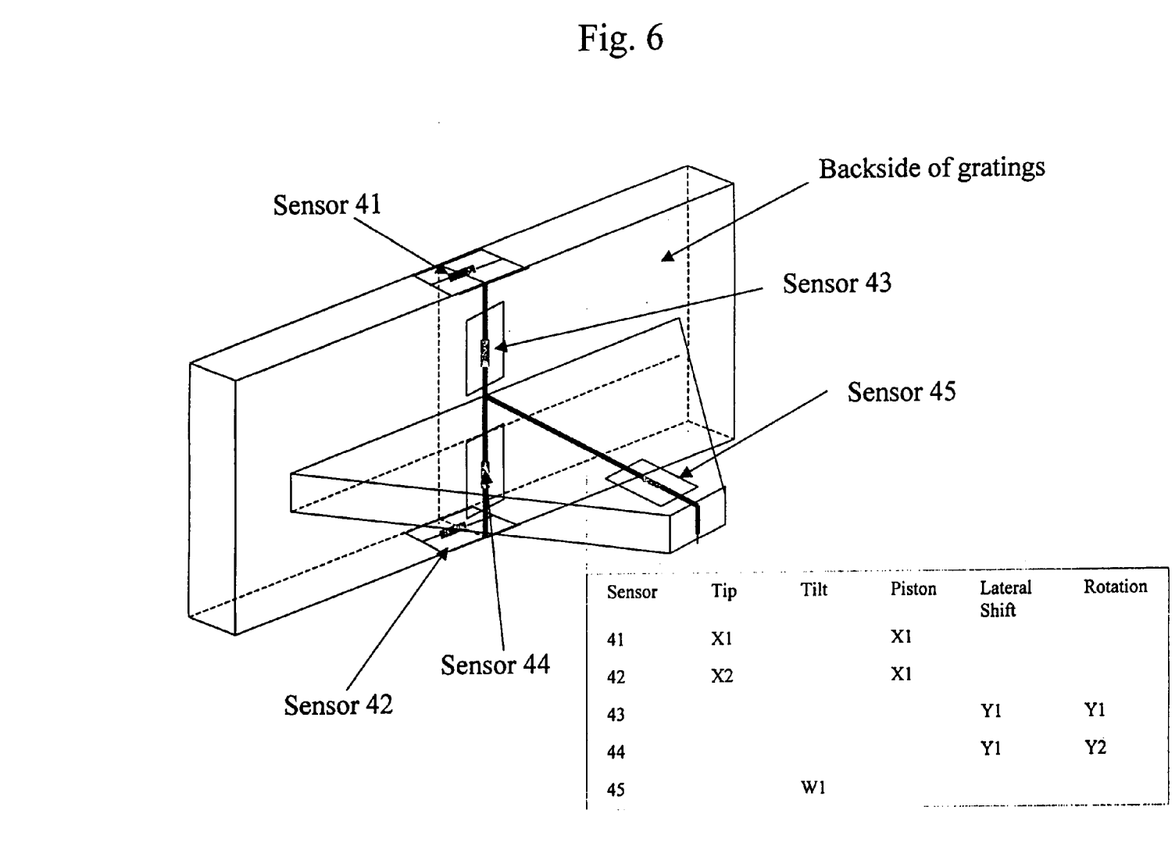
FIG. 6 shows an arrangement sensors which are attached to the edges of the gratings, between gratings, and on a bracket connecting to the back side of gratings and having a gap aligned with the gap between the gratings, the sensors providing outputs representing tip, tilt, piston, lateral shift and rotation as shown in the chart adjacent to the figure, which outputs are used to provide for additive coherent operation of the grating array, alternatively to the outputs from the interferometer and from the far field diffraction limited spot, as shown in FIG. 5.

Another embodiment of the invention is shown in FIG. 6. Highly sensitive capacitive sensors, suitably sensors having nm resolution may be used. Such sensors are grouped to provide positional information of one grating with respect to another, without the need of an interferometer. Depicted are edge-, and back-mounted sensors which straddle the residual gap between the gratings. Sensors 41 and 42 can provide piston data. Sensors 43 and 44 provide lateral shift and rotation data. Sensor 45, mounted on stable, non-distorting brackets, fastened to the respective gratings provides Tilt—$\Delta\theta x$. A logic table in FIG. 6 summarizes the available grating-to-grating relationships. The sensors 41, 42, 43, 44 and 45 may be calibrated in an interferometer to provide initial alignment. Then they are to be included in a computer servo-loop to maintain long term, the coherently additive grating positions.

From the foregoing description, it will be apparent that there has been provided improved grating array systems and methods of making such systems. Variations and modifications in the herein described systems and methods in accordance with the invention will undoubtedly suggest themselves to one skilled in the art. Accordingly, the foregoing description should be taken as illustrative and not in a limiting sense.

The invention claimed is:

1. A method of providing a grating array system comprising the step of aligning at least one grating of a plurality of gratings with respect to another providing effectively one large monolithic grating, with said plurality of gratings operative in a coherently additive mode to simultaneously satisfy the following equations $$OPD_L = -OPD_P, \text{ where } OPD_L = \Delta x(\lambda/d), \Delta x = L - Md;$$
$$\text{and } OPD_P = 2(\Delta z)\cos\theta_i, \Delta z = P - N\lambda, \quad (1)$$

wherein
OPD is an optical path difference,
$\Delta x$ is a change in a movement in a lateral direction parallel to the plane of the gratings,
L is a lateral shift between gratings,
M is an integer,
d is a grating pitch,
$\lambda$ is a wavelength of light, which is the average wavelength for polychromatic light,
$\Delta z$ is a change in a movement in the piston shift direction perpendicular to the plane of the gratings
P is a piston shift between the gratings,
N is any integer, and
$\theta_r$ is the rotation of one grating with respect to each other about a line perpendicular to the grating plane $$\Delta\theta_r = -\Delta\theta_y * ctg\theta_i, \quad (2)$$

wherein
$\Delta\theta_r$ is a change in rotation direction of one grating with respect to the other gratings about a line perpendicular to a grating plane,
$\Delta\theta_y$ is a change in an angular displacement in the y-direction known as tip, and $\theta_i$ is an angle of incidence of the incident light beam on the grating array system $$\Delta\theta_x = 0, \quad (3)$$

wherein $\Delta\theta_x$ is a change in an angular displacement in the x-direction known as tilt.

2. The method according to claim 1 wherein said alignment is carried out with adjustment in a number of degrees of freedom less than all degrees of freedom of the gratings the compensating nature of longitudinal and lateral piston, in-plane rotation and tip adjustment (at the grating working angle), and the tilt adjustment, and delta-tilt adjustment of the adjacent grating due to differences in groove spacing is utilized.

3. The method according to claim 1 further comprising the step of diffracting high power beams suitable for chirped-pulse amplification with the gratings while the gratings are maintained in alignment for additive coherent operation.

4. The method according to claim 1 further comprising the steps of measuring an interference pattern to determine the state of alignment of said gratings and a diffraction limited spot to determine the state of the coherently additive mode, and moving one grating with respect to another in the array in response to the measurements of the pattern and spot until the alignment for coherent additive operation is obtained.

5. The method according to claim 1 wherein said alignment step comprises the conjointly operative steps of interferometric sensing, data reduction and computer controlled actuation of said at least one grating to provide tip/tilt and piston movement of said at least one grating for additive coherent operation of said plurality of gratings.

6. An apparatus for providing a grating array comprising means for monitoring tip, tilt and piston relationships of a plurality of gratings in the grating array which includes a wavefront sensor set at a conjugate angle to the gratings, and a laser beam incident on said gratings and illuminating said sensor.

7. A grating array system comprising a plurality of gratings and a plurality of grating sensors, arranged in referenced relationship to the gratings to measure the positional relationship of the gratings, and means operated by the sensors to adjust the position of at least one of said plurality of gratings for coherent additive operation of the gratings in the system.

8. The system according to claim 7 wherein the grating array has M×N (M, N=2, or larger) gratings, and a plurality of sensors operative to adjust the grating which corresponding to the number of grating boundaries of said grating and located at said boundaries.

* * * * *